(12) United States Patent
Harrelson

(10) Patent No.: US 9,162,527 B1
(45) Date of Patent: Oct. 20, 2015

(54) MECHANICALLY INTERLOCKED WHEEL

(71) Applicant: White Oak Industries, Inc., Archdale, NC (US)

(72) Inventor: Anthony T. Harrelson, Sophia, NC (US)

(73) Assignee: White Oak Industries, Inc., Archdale, NC (US)

( * ) Notice: Subject to any disclaimer, the term of this patent is extended or adjusted under 35 U.S.C. 154(b) by 0 days.

(21) Appl. No.: 14/330,089

(22) Filed: Jul. 14, 2014

(51) Int. Cl.
*B60B 33/00* (2006.01)
*B29C 70/84* (2006.01)
*B29L 31/32* (2006.01)

(52) U.S. Cl.
CPC ............. *B60B 33/0028* (2013.01); *B29C 70/84* (2013.01); *B29L 2031/32* (2013.01)

(58) Field of Classification Search
CPC .. A63C 17/22; A63C 17/223; B06B 33/0028; B06B 33/0036; B06B 33/0049
USPC .......... 301/5.301, 5.304, 5.306, 5.307, 5.308; 16/45
See application file for complete search history.

(56) References Cited

U.S. PATENT DOCUMENTS

| | | | | |
|---|---|---|---|---|
| 2,267,403 A * | 12/1941 | Herold | ................................ | 16/45 |
| 4,592,595 A * | 6/1986 | Freeman | .................... | 301/5.308 |
| 5,660,447 A * | 8/1997 | Angelici | ......................... | 301/5.7 |
| 5,725,284 A * | 3/1998 | Boyer | .......................... | 301/5.302 |
| 5,924,705 A * | 7/1999 | Kubelka | .................... | 280/11.231 |
| 6,036,278 A * | 3/2000 | Boyer | .......................... | 301/5.309 |
| 6,227,622 B1 * | 5/2001 | Roderick et al. | ........... | 301/5.304 |
| 6,629,735 B1 * | 10/2003 | Galy | ........................... | 301/5.307 |
| 6,655,747 B2 | 12/2003 | Young et al. | ................ | 301/5.301 |
| 6,752,471 B2 * | 6/2004 | Hsia | .......................... | 301/64.701 |
| 7,011,317 B1 | 3/2006 | Hicks et al. | .............. | 280/33.991 |
| 2003/0168904 A1 * | 9/2003 | Frigo et al. | ................. | 301/5.307 |
| 2005/0218712 A1 * | 10/2005 | Beaumier | .................. | 301/5.308 |
| 2009/0039636 A1 * | 2/2009 | Charell | ......................... | 280/841 |
| 2014/0331450 A1 | 11/2014 | Harrelson | | |

FOREIGN PATENT DOCUMENTS

| | | | |
|---|---|---|---|
| CA | 2465749 A1 | * | 10/2005 |
| CA | 2502897 A1 | * | 10/2005 |
| DE | 20007532 U1 | * | 7/2000 |

* cited by examiner

*Primary Examiner* — Kip T Kotter
(74) *Attorney, Agent, or Firm* — Blake P. Hurt; Tuggle Duggins P.A.

(57) ABSTRACT

A mechanically interlocked wheel assembly including a rigid core formed from aluminum integrally bound to an elastomeric infill by passing the infill material through a plurality of slots defined in the core rim during the molding process is provided. A ground-engaging tread is attached to the infill to form a structurally superior wheel assembly capable of carrying heavy loads in extreme environments for an extended period of time without the need to replace the wheel components. A method of manufacturing a mechanically interlocked wheel assembly is also included herein.

12 Claims, 4 Drawing Sheets

MECHANICALLY INTERLOCKED WHEEL

FIELD OF THE INVENTION

The invention herein pertains to wheel assemblies and particularly pertains to a wheel assembly including a core mechanically interlocked to a wheel with tread.

DESCRIPTION OF THE PRIOR ART AND OBJECTIONS OF THE INVENTION

Caster wheel assemblies for transportation vehicles such as carts for use in industrial, manufacturing, and retail settings are known. Typically, wheels for such transportation vehicles are made from hard materials that exhibit desirable wear characteristics, such as polyurethane and aluminum. It is not uncommon for these wheels to experience extreme operating conditions, such as loads in excess of several hundred pounds, high temperatures, and unsecured loads that shift longitudinally and laterally during transport. Further, due to the inherent problems of mass-producing caster wheels with precision, conventional methods of production results in many caster wheels having less than the required tolerances to ensure a consistent smooth operation. This characteristic can frequently cause the well known "wobble wheel" as well as squeaking. Additionally, the cost and inefficiency in manufacturing the assembly is high, and thereby translates to higher consumer pricing.

One approach to addressing the disadvantages in the prior art is to mold the wheel components together, specifically the bearing, the wheel cores, and wheels that may or may not include a hub. High strength polymer resin compounds have been used extensively for making wheels. More recently, the use of bearing components that are molded in the hubs of such wheels has been suggested to absorb shock loads and to lower the cost of the wheel and bearing assemblies. These assemblies are still complex to manufacture since the bearing parts must still be accurately placed within the mold. To ensure precision of the molded in bearing, the wheel hub must be precisely formed as well. The requisite level of precision adds increased manufacturing time and cost to the resulting assembly.

Thus, in view of the problems and disadvantages associated with prior art devices, the present invention was conceived and one of its objectives is to provide a wheel assembly with an intermediate member disposed between a metallic core and a polyurethane wheel defining treads.

It is another objective of the present invention to provide a wheel assembly with an elastomeric infill positioned between an aluminum core configured to contain an axle assembly and a ground-engaging tread.

It is a further objective of the present invention to provide a wheel assembly for use with a caster wheel, which is a wheel pivotable about an axle defining a vertical axis.

It is still another objective of the present invention to provide a wheel assembly formed from multi-stage injection or liquid molding.

It is yet another objective of the present invention to provide a wheel assembly including a core that defines a plurality of ovular apertures about the core periphery.

It is a further objective of the present invention to provide a wheel assembly that reduces the noise generated during use, for example in transporting a loaded cart.

It is still a further objective of the present invention to provide a wheel assembly with a core integrally molded within a polymeric infill.

It is yet a further objective of the present invention to provide a wheel assembly with a mechanical interlock between the infill intermediate and the metal core.

Various other objectives and advantages of the present invention will become apparent to those skilled in the art as a more detailed description is set forth below.

SUMMARY OF THE INVENTION

The aforesaid and other objectives are realized by providing a wheel assembly comprising a rigid core formed out of aluminum and defining a plurality of apertures positioned about the circumference of the core mechanically interlocked with a polyurethane infill defining one or more ribs for receiving a wheel cover formed out of rubber for engaging a substrate such as the ground. A method of manufacturing the mechanically interlocked wheel assembly including the steps of molding a core defining a central aperture, a plurality of circumferential apertures, and one or more ribs and integrally molding liquid polyurethane through the apertures to form a mechanically interlocked wheel assembly configured for receiving a wheel cover constituting less than twenty-five percent (25%) of the overall wheel radius therearound.

DETAILED DESCRIPTION OF THE PREFERRED EMBODIMENT AND OPERATION OF THE INVENTION

Figure 1:
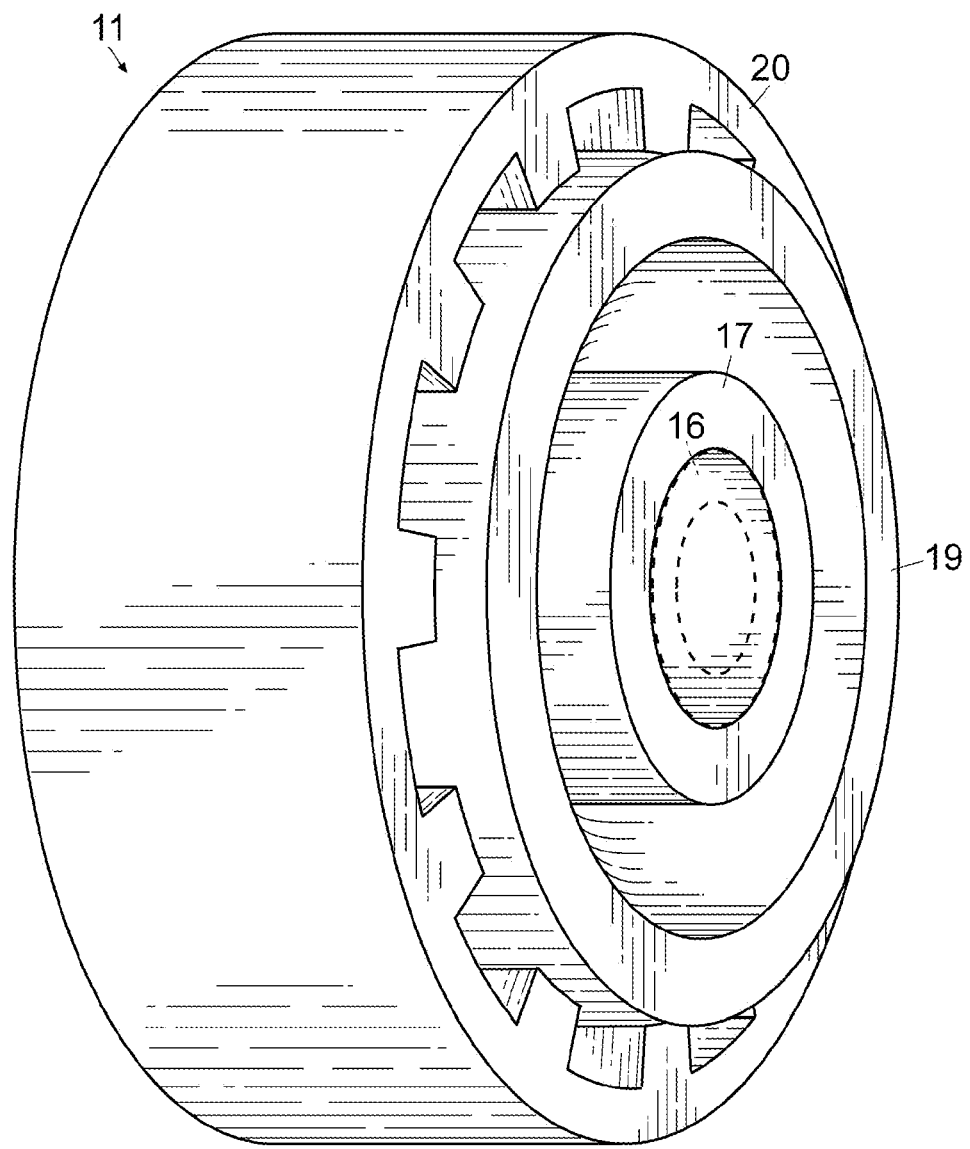
FIG. 1 shows a side perspective view of a wheel core.

For a better understanding of the invention and its operation, turning now to the drawings, FIGS. 1-5 display embodiments of wheel assemblies 10, 10' including respectively cores 11, 11', infill 12, and tread 13. Core 11 is preferably a cylindrical structure formed from a rigid material such as aluminum or polyolefin, for example polypropylene, although any material with a hardness rating of greater than ninety (90) Shore A and more preferably greater than ninety-five (95) Shore A on the durometer scale is acceptable. Ground-engaging tread 13 (illustrated schematically in FIG. 5), by comparison, is formed from a slightly softer material than core 11 and preferably measures greater than eighty-five (85) Shore A on the durometer scale. For example, polyurethane or stiff rubber each exhibit good wear and low sound transmission characteristics, and are therefore useful in forming tread 13. Intermediate infill 12 is positioned between core 11 and tread 13 and is preferably formed from a material that is softer on the durometer scale than either core 11 or tread 13.

Figure 5:
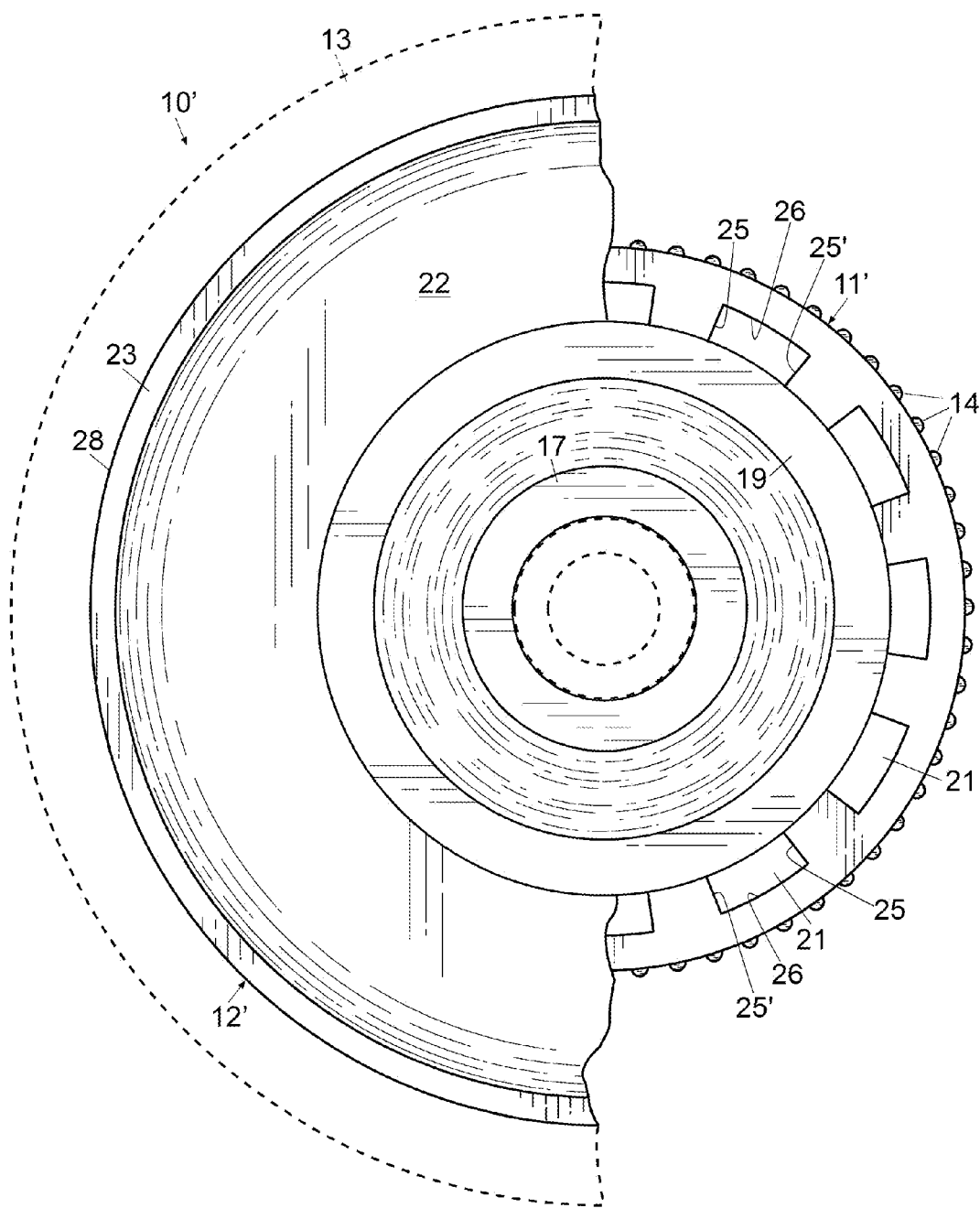
FIG. 5 illustrates a top plan view of an alternate embodiment of a wheel assembly.

As shown in FIG. 5, tread 13 defines a relatively narrow-width layer of material and makes up less than fifty percent (50%) of the overall wheel radius of wheel assemblies 10, 10', and preferably about fifteen percent (15%) of the wheel radius. Tread 13 extends circumferentially around infill 12 and core 11, forming the whole ground-engaging section of wheel assemblies 10, 10'. Tread 13 may define a plurality of ribs (not shown), similar to ribs 14 or 24 (FIG. 2), or may be smooth (i.e. without ribs), depending on the desire of the user and the anticipated operating environment of wheel assemblies 10, 10'. For example, if wheel assembly 10 is to be utilized indoors and on a paved surface, tread 13 without ribs may be more efficient and offer less resistance during use. Alternatively, if wheel assembly 10 is deployed in an environment where ribs are advantageous to impart added traction to a substrate, tread 13 including ribs may be preferable.

Figure 4:
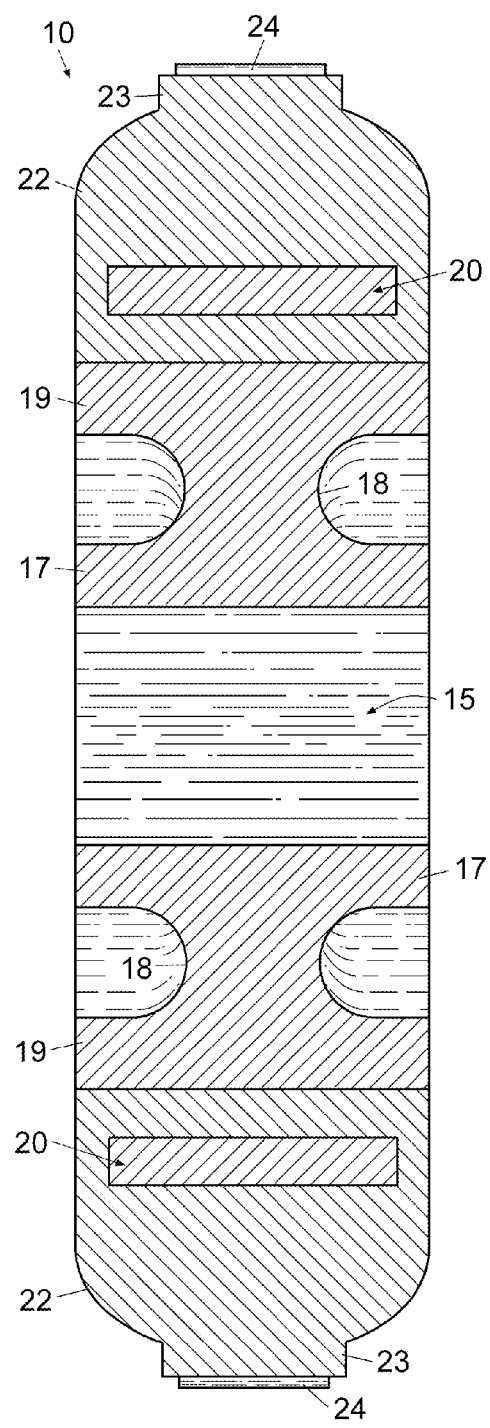
FIG. 4 demonstrates an elevated cross-sectional view of the wheel assembly of FIG. 2 taken along lines 4-4.

As shown in FIGS. 1 and 4, core 11 defines cylindrical central aperture 15 sized to receive bearing 16, shown in dotted fashion to indicate that any appropriately sized bearing is acceptable within aperture 15. Core 11 further includes inner flange 17 which surrounds central aperture 15 and serves as the primary stabilizer of bearing 16 along with any core guard, race assembly, or axle (not shown) engaged thereto. Bearing 16 may be a roller or ball bearing formed from metal, nylon, or any other material with a low coefficient of friction for engaging an axle. Oriented perpendicularly to floor 18 of core 11, outer flange 19 is opposingly attached in a parallel position to inner flange 17, defining a U-shape (FIG. 4). Attached to the exterior of outer flange 19, core rim 20 defines a plurality of slots 21 therethrough, preferably spaced evenly around the outer perimeter of rim 20 and includes an exterior surface 27 that extends circumferentially about outer flange 19, defining an annular shape without decreasing the axial distance from the center of central aperture 15. Each slot 21 is formed by a pair of radially extending slot walls 25, 25' joined by a linking exterior slot wall 26 that defines an arcuate shape and circumferentially extends parallel to core rim 20 between walls 25, 25'. An embodiment of core 11' may further include a plurality of core ribs 14 (FIG. 5) positioned on the exterior core rim surface and extending transversely across core 11' with a vertical distance defined therein, increasing the surface area for bonding to infill 12 as explained in greater detail herein and forming a superior engagement between the respective components. Preferably, core 11 is formed from aluminum or polypropylene, as these materials are stiff and structurally robust enough to support the expected operating environment experienced by wheel assembly 10. Further examples of acceptable core 11 materials are listed in Table 1.

Figure 2:
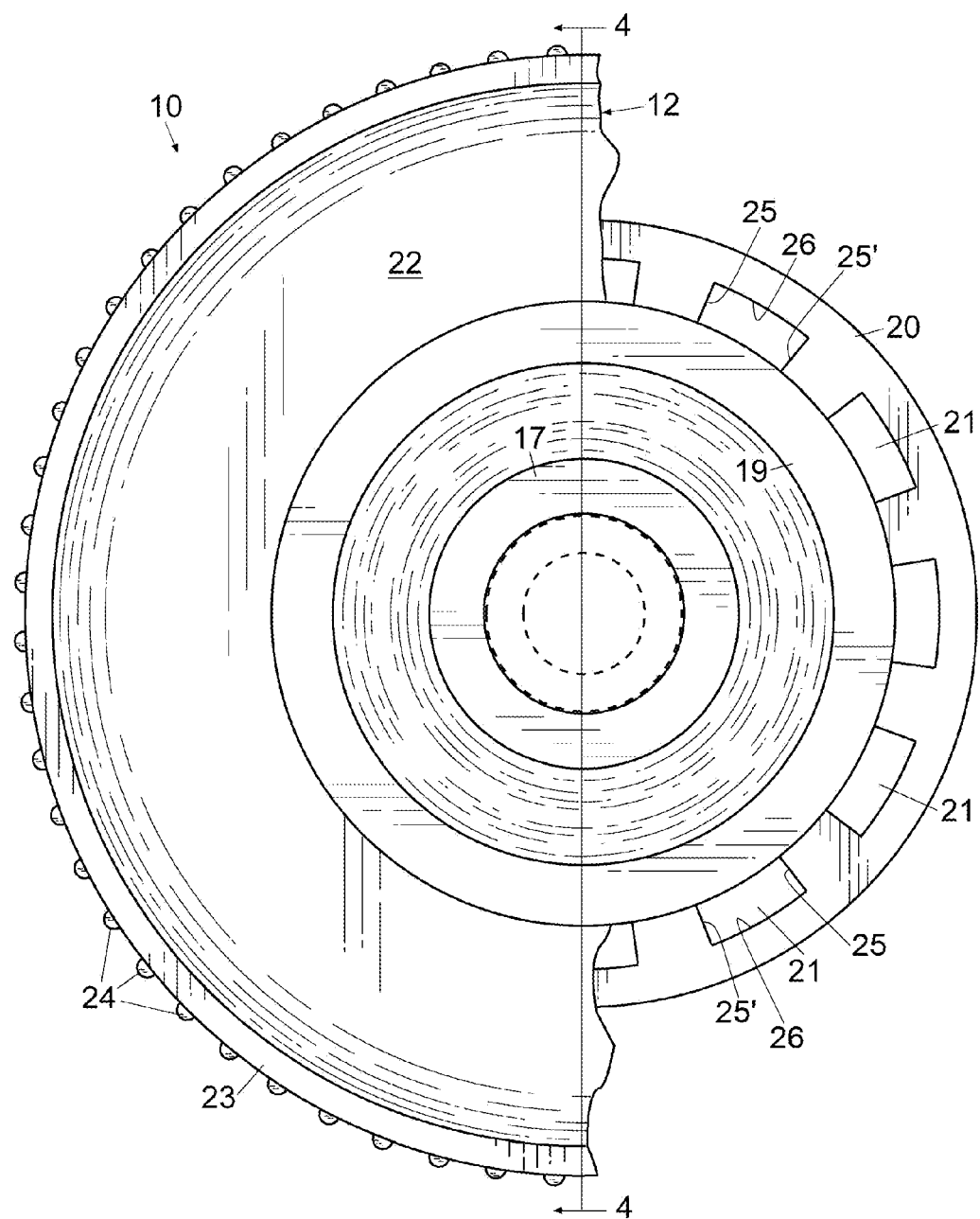
FIG. 2 pictures a top plan view of a wheel assembly.
Figure 3:
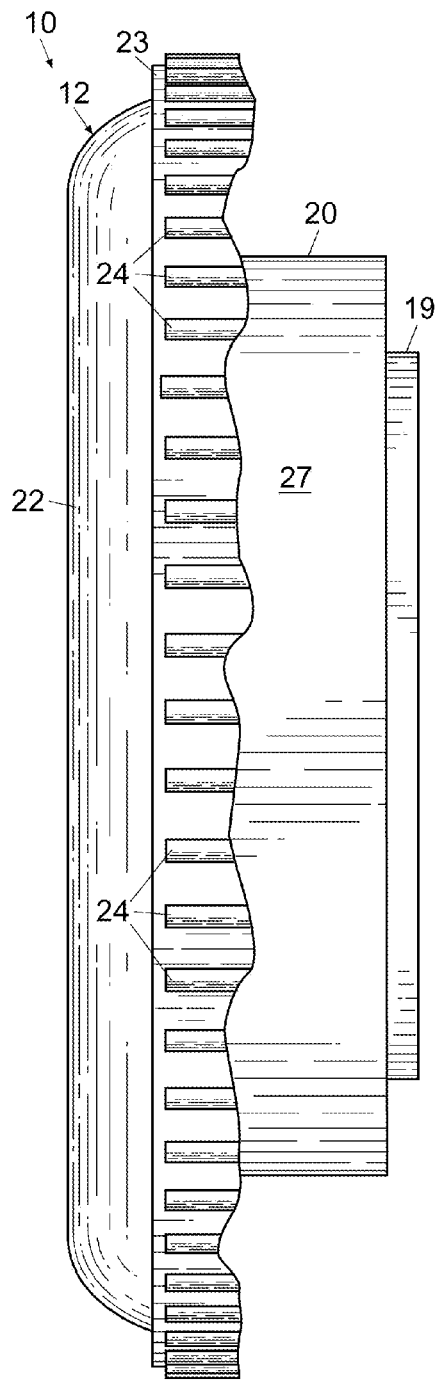
FIG. 3 depicts an elevated side view of the wheel assembly of FIG. 2.

Intermediate polymer infill 12 is positioned between core 11 and tread 13 and after formation preferably includes a largely planar central disk section 22 and an outer infill rim 23 and may include an exterior surface 28 (FIG. 5) that extends circumferentially about outer flange 19, defining an annular shape without decreasing the axial distance from the center of central aperture 15. As seen in FIGS. 3 and 4, core rim 20 is slightly narrower than flanges 17, 19 allowing infill 12 to completely surround rim 20 and abut flange 19 during application. Infill 12 may be formed from an elastomeric polymer such as polyurethane, and an embodiment of infill 12 may include infill ribs 24 as shown in FIGS. 2, 3 and 4. Preferably, liquid polyurethane is poured into, around, and through rim 20 of core 11, for example during a hand molding or injection molding process, creating both hydrogen bonded (also referred to as chemically bonded) and mechanically interlocked (may be considered integrally formed) wheel assemblies 10, 10'. The use of other attachment methods such as adhesives and mechanical fasteners may be utilized in alternate embodiments of wheel assemblies 10, 10'. Further examples of acceptable infill materials are listed at Table 1.

A method of manufacturing wheel assemblies 10, 10' may include the steps of providing a core material such as aluminum, an infill material such as polypropylene, and a tread material such as polyurethane. The aluminum may be molded, for example by hand molding or injection molding, to form core 11 that defines central aperture 15, inner flange 17 and outer flange 19 connected by floor 18, and rim 20 defining a plurality of circumferentially positioned slots 21. An embodiment of core 11' may also include a plurality of core ribs 14 positioned on the exterior surface of rim 20. The polyurethane may be molded, for example by hand molding or injection molding, to form tread 13, embodiments of which may or may not include tread ribs. The polypropylene may be molded in the same manner to form infill 12 including infill disk 22 connected to infill rim 23. Embodiments of infill 12' may or may not include infill ribs 24. Preferably, core 11 and tread 13 are molded separately, and then combined in a mold where infill 12 is introduced. Such placement allows the liquid material of infill 12 such as polypropylene to encase rim 20 of core 11 through slots 21 and adhere directly thereto while simultaneously adhering to an inner surface of tread 13, forming an integrated wheel assembly 10 without the need of adhesives, mechanical fasteners, or the like. Alternatively, core 11 may be molded first, infill 12 molded to it as previously described, and tread 13 may be added later, bonding directly to infill 12, in one embodiment via the increased surface area provided by infill ribs 24, or with the use of an adhesive (not shown). As would be understood during formation the molds prevent the material of infill 12 from overlapping flange 19 while allowing for the creation of smooth central disk 22, rounded substantially on the outer edges prior to formation of rim 23 providing a relatively thick, protective covering of core 11 as seen in FIG. 4. Depending on the specific mold used ribs 24 may or may not be formed during the introduction of infill 12. Once wheel assemblies 10, 10' are formed, bearing 16, lubricants, and other wheel accessories may be inserted into central aperture 15 and wheel assembly 10 may be utilized as a wheel on a transportation vehicle, for example as a caster wheel on a cart.

For a non-exhaustive list of the materials used in this method, see Table 1. It should be understood that the information presented in Table 1 is suggestive, and any presented pairings should not be viewed as exclusive.

TABLE 1

| Tread Material | Infill Material | Core Material | Properties |
|---|---|---|---|
| Polyurethane | Polyurethane | Aluminum | strong exterior rigid noise reduction |
| Polyurethane | Polyurethane | Polyurethane | Strong exterior rigid |
| Rubber | Rubber | Aluminum | Interior |
| Polyurethane | Polyurethane | Nylon fiberglass | Strong exterior rigid |
| Polyurethane | Polyurethane | Polypropylene | Strong exterior rigid |
| Acetal | Acetal | Polypropylene | Abrasion resistant |
| Rubber | Rubber | Polypropylene | Exterior economical |
| Nylon | Nylon | Glass filled | Core low friction exterior |
| Thermoplastic rubber | Thermoplastic rubber | Polypropylene | Strong exterior rigid |
| Polypropylene | Polypropylene | Acetal blend | Strong exterior rigid |
| Elastomer | Elastomer | Polypropylene | Noise reduction |
| Teflon | Teflon | Thermoplastic | Noise reduction |
| Elastomer | Elastomer | Neat plastic | Noise reductions |
| Antimicrobial additive in material | Antimicrobial additive in material | | In material/exterior |
| Elastomer | Elastomer | Metal | Rigid core antimicrobial exterior |
| Thermoplastic rubber | Thermoplastic rubber | Aluminum | Inexpensive core |
| Conductive additive | Conductive additive | Acetal | Antistatic |

The illustrations and examples provided herein are for explanatory purposes and are not intended to limit the scope of the appended claims.

I claim:

1. A wheel assembly comprising a core formed from an inner flange and an outer flange attached to opposing ends of a floor and a core rim defining a continuous exterior surface, the core defining a plurality of slots positioned circumferentially about the core rim a tread circumferentially oriented around the core, and an infill encasing the core rim and defining a disk shape with an infill rim defining a continuous exterior surface located a uniform radial distance from an axis of the wheel and positioned between and integrally affixed to the core and the tread, the infill defining a plurality of ribs each extending continuously and transversely across the exterior surface of the infill rim and defining a rib length less than a width of the infill rim, whereby the core defines a hardness greater than the tread.

2. The wheel assembly of claim 1 wherein the core defines a plurality of ribs each extending transversely across the smooth exterior surface of the core rim.

3. The wheel assembly of claim 1 wherein the core has a hardness greater than ninety (90) Shore A on the durometer scale.

4. The wheel assembly of claim 1 wherein the tread has a hardness greater than eighty-five (85) Shore A on the durometer scale.

5. The wheel assembly of claim 1 wherein the infill has a hardness value of less than seventy-five (75) Shore A on the durometer scale.

6. The wheel assembly of claim 1 wherein the core is formed from aluminum.

7. The wheel assembly of claim 1 wherein the infill is formed from polyurethane.

8. The wheel assembly of claim 1 wherein the tread is formed from polyurethane.

9. A wheel assembly comprising:

an aluminum core defining a hardness rating of greater than ninety-five (95) Shore A on the durometer scale and a plurality of slots each defined by a pair of radially extending walls joined by an arcuate linking exterior wall extending parallel to an outer surface of a cylindrical outer flange, each slot positioned circumferentially about a core rim defining a continuous exterior surface, the core including an inner flange attached by a floor to the outer flange forming a U-shape and sized to encircle a cylindrical central aperture defined by the core and receive a bearing, the core rim adjoined to the outer flange and defining a plurality of ribs each extending transversely across the exterior surface of the core rim and defining a vertical height extending radially from a core rim exterior surface, the core rim defining a longitudinally facing cylindrical portion that extends a distance less than a distance that a longitudinally facing cylindrical portion of the outer flange extends to define a shoulder on the outer flange for seating an infill;

a polyurethane tread defining a hardness rating of greater than eighty-five (85) Shore A on the durometer scale but less than the hardness rating of the core, the tread circumferentially oriented around the core and making up about fifteen percent (15%) of the wheel assembly radius; and the infill formed from polyurethane and defining a hardness rating of less than seventy-five (75) Shore A on the durometer scale formed in the shape of an infill disk defining a rim, an entirety of an exterior radial surface of the rim located the same radial distance from an axis of the wheel and positioned between and mechanically interlocked to the core and the tread.

10. The wheel assembly of claim 9 whereby the plurality of slots pass entirely laterally from one side of the rim to the other.

11. A wheel assembly comprising a core formed from:

an inner flange that defines a longitudinally facing cylindrical portion;

an outer flange extending circumferentially about the inner flange and defining a longitudinally facing cylindrical portion, whereby the longitudinally facing cylindrical portion of the outer flange extends in a longitudinal direction;

a floor interconnecting the inner flange and the outer flange;

a core rim extending circumferentially around and parallel to the outer flange and defining a longitudinally facing cylindrical portion that extends a distance less than a distance that the longitudinally facing cylindrical portion of the outer flange extends to define a shoulder on the outer flange for seating an infill;

whereby the core rim defines an inner facing surface that engages with the outer flange, and further defines a plurality of slots that extend circumferentially and longitudinally, each slot defining a top surface, a bottom surface, and a pair of side surfaces interconnecting the top surface and the bottom surface, whereby the bottom surface of each of the slots is entirely formed by an intersection with the outer flange such that the pair of side surfaces terminate into the outer flange;

whereby the core rim is defined by a pair of opposingly oriented continuous lateral sides joined by a transversely extending continuous outer face;

whereby the outer flange is defined by a transversely extending continuous outer face;

whereby the infill extends radially of the core rim and into the slots and the longitudinally facing cylindrical portion of the outer flange, the infill forming a circumferentially extending surface to which a tread is applied, a first portion of the infill facing the outer face of the core rim such that the first portion of the infill defines a corresponding continuous surface, and a second portion of the infill facing the outer surface of the outer flange such that the second portion of the infill defines a correspondingly continuous and collinear surface.

12. The wheel assembly of claim 11 whereby the core defines a plurality of ribs each extending transversely across the exterior surface of the core rim.

* * * * *